Oct. 18, 1960        J. H. HALSTEAD        2,956,645
ADJUSTABLE FRAME ASSEMBLY FOR LIFTS
Filed May 26, 1958                        2 Sheets-Sheet 1
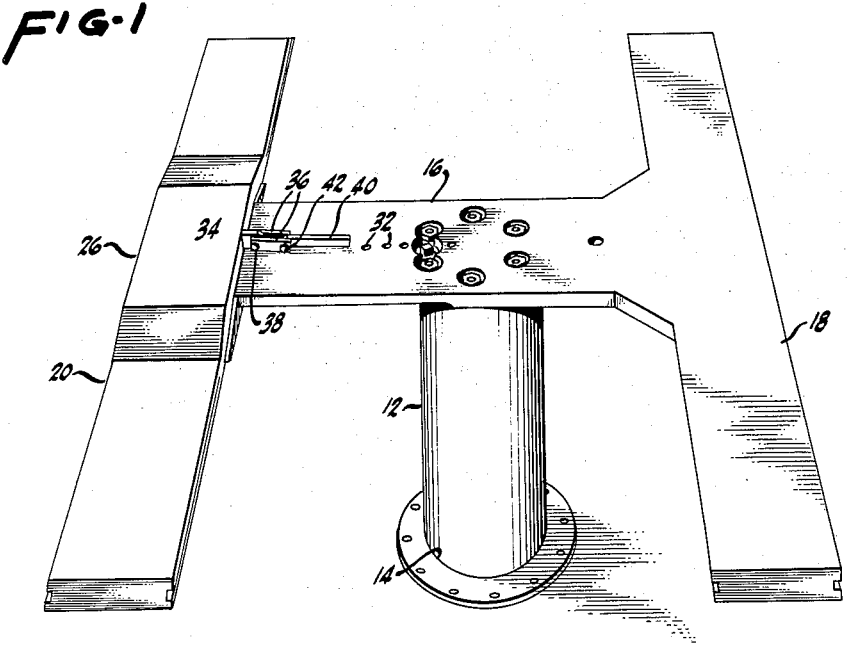
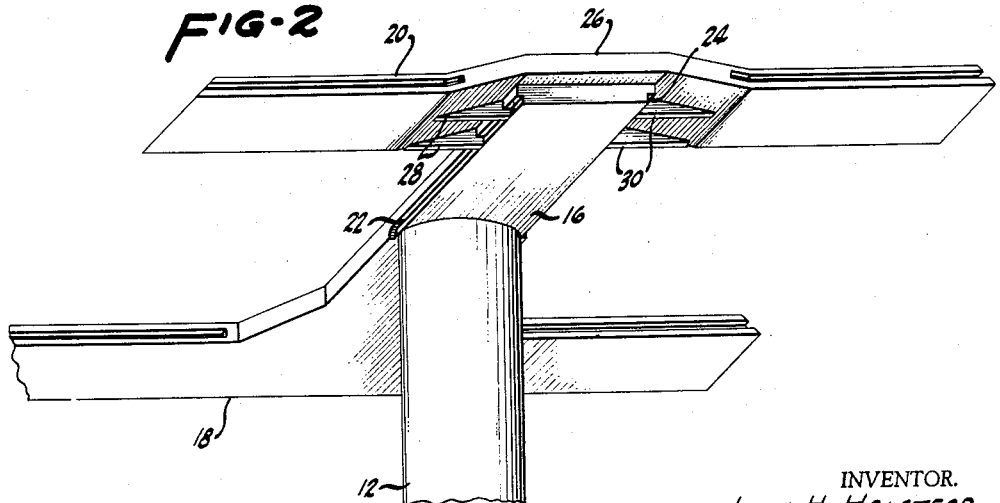
INVENTOR.
JOHN H. HALSTEAD
BY
Lippincott, Smith & Ralls
ATTORNEYS Oct. 18, 1960  J. H. HALSTEAD  2,956,645
ADJUSTABLE FRAME ASSEMBLY FOR LIFTS
Filed May 26, 1958  2 Sheets-Sheet 2
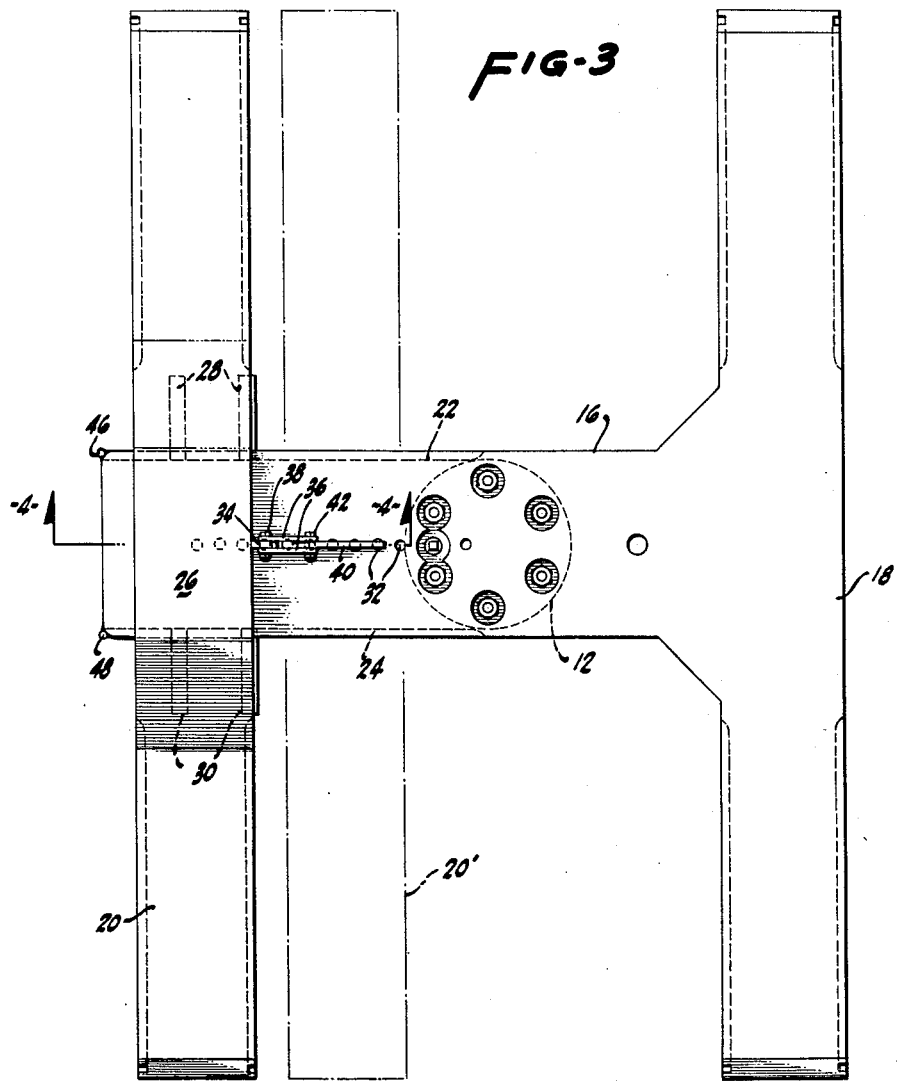
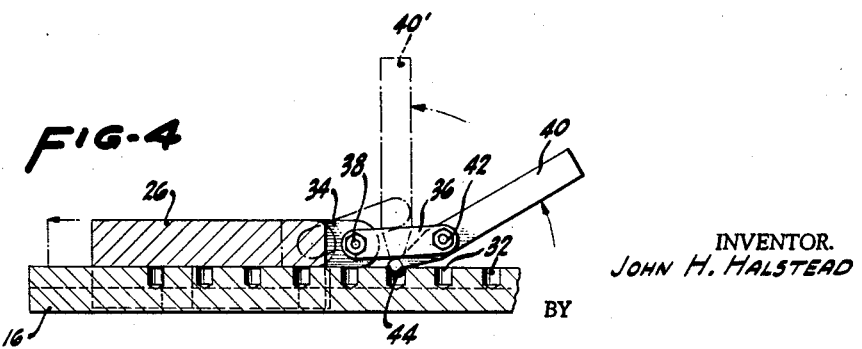
INVENTOR.
JOHN H. HALSTEAD
BY
Lippincott, Smith & Ralls
ATTORNEYS United States Patent Office 2,956,645
Patented Oct. 18, 1960

2,956,645

ADJUSTABLE FRAME ASSEMBLY FOR LIFTS

John H. Halstead, 1024 Emory St., San Jose, Calif.

Filed May 26, 1958, Ser. No. 737,694

3 Claims. (Cl. 187—8.67)

This invention relates to automotive vehicular lifts having an adjustable-width H-frame assembly or superstructure.

Automotive vehicular lifts are generally of two types, the so-called "frame-lift" and the "drive-on" type. In using the "frame-lift" type of vehicular lift, the vehicle to be raised is driven over the lift so that the H-frame assembly of the lift will be disposed between the wheels of the vehicle with the parallel rails of the frame assembly immediately below the chassis frame of the vehicle. The parallel rails are then moved upwardly beneath the vehicle and engage the vehicle chassis in longitudinally mating relation with the rails of the vehicle chassis frame. In the "drive-on" type of lift, the wheels of the vehicle to be raised are driven up over the usually beveled ends of the pair of parallel rails until both front and back wheels of the vehicle are supported on the rails.

However, among the vehicles now in common use, the distance between the side rails of the vehicle chassis frame and the distance between the wheels on opposite sides of the vehicle frame vary considerably. Heretofore, the frame assembly or superstructure of the lift had its parallel rails rigidly set at a fixed spacing. Therefore, in prior lifts with their vehicle-supporting rails at a fixed distance apart, the different widths of vehicle chassis frames and the different distances between wheels on opposite sides of narrow and wide vehicles could not be accommodated by a single lift. Nor, in general, can the same lift be used either as a "frame lift" or as a "drive-on" lift, selectively.

A principal object of the present invention is to provide a vehicle lift with an adjustable-width frame assembly.

Other objects and advantages will become apparent from a consideration of the following detailed description, taken in conjunction with the accompanying drawings wherein:

Fig. 1 is a projection view of an automotive vehicle lift incorporating the present invention, as seen from the top and front thereof;

Fig. 2 is a projection view of the same lift, as seen from below and to one side thereof;

Fig. 3 is a top plane view of the same lift; and

Fig. 4 is a fragmentary section taken along the line 4—4 of Fig. 3.

The drawings show a lift for raising automotive vehicles above the ground or floor level. The lift has a vertically movable column or piston 12 which extends through a top opening 14 of a cylinder buried in the ground, or otherwise mounted below the floor level in the usual manner. Conventional means (not shown) are employed for raising and lowering piston 12. Mounted on top of piston 12 and movable therewith is a horizontal H-frame superstructure comprising a cross member 16 and two parallel rails 18 and 20. The superstructure differs from that of a conventional lift in that the distance between rails 18 and 20 is adjustable, as will now be explained.

Opposite sides of cross member 16 are undercut, as is illustrated at 22 and 24, to form trackways for inward and outward movement of rail 20 upon cross member 16.

The rail 20 has an intermediate portion 26 offset outwardly from the general horizontal plane of the H-frame and riding on the flat upper surface of cross member 16, as shown. A pair of guides 28 is secured to rail 20 as by welding, in sliding engagement with the undercut side 22 of cross member 16, and another pair of guides 30 is secured to rail 20 in sliding engagement with the opposite undercut side 24 of cross member 16. Each of the guides is of a generally triangular configuration, as shown, with a tongue engaging the undercut cross member so that the rail 20 is held securely in the horizontal plane of the H-frame, and parallel to rail 18, but can be moved laterally to adjust the spacing between the two rails.

Lateral movement of rail 20 may be readily accomplished by a jacking adjuster carried by the movable rail and engageable in successive ones of a plurality of spaced holes 32 arranged in a row along the cross member 16. The jacking adjusted comprises a lug 34 extending over cross member 16 from the inner edge of a part 26, a pair of parallel links connected thereto by a horizontal bolt 38 in movable and a vertical arcuate path about said bolt, and a jacking lever 40 connected to the other end of said links 36 by a horizontal bolt 42 and movable in a vertical arcuate path about the bolt 42.

As will be clearly seen in Fig. 4, the lever 40 has a long end forming a handle and a short end terminating in a ball 44 adapted for engagement in the holes 32. It is obvious that the rail can be moved inward or outward, selectively, along cross member 16 by engaging ball 44 in successive holes 32 and manipulating the handle of lever 40. It will be noted in Fig. 1 that lever 40 in its inactive position lies on the upper surface of the cross member 16 and is lower than the top of the offset portion 26. Hence, it does not interfere with the use of the lift.

Thus, adjustment of the spacing between rails 18 and 20 can be readily accomplished to accommodate any particular width of vehicle, or to use the same lift either as a "frame" lift or as a "drive-on" lift, selectively, Stops 46 and 48 prevent over-travel. The stops 46 and 48 have been deliberately omitted from Fig. 2 so that the structure and location of undercuts 22 and 24 can be more clearly seen. In Fig. 3 a second position of rail 20 is indicated by broken line at 20', and in Fig. 4 a second position of lever 40 is indicated by broken line 40'.

It should be understood that the invention is not limited to the specific example as herein illustrated and described, and that its scope is defined by the following claims.

What is claimed is:

1. A vehicle lift for accommodating vehicles of different widths, comprising a central column movable in a vertical path above a ground level, a horizontal H-frame assembly carried by said column for movement therewith and selectively adjustable to support any one of the different width vehicles thereon, said assembly comprising a horizontal cross member having a longitudinal axis and secured upon the top of said column, said cross member having undercut edges on opposite sides thereof which define two trackways, a pair of parallel, horizontal rails adapted to support a vehicle thereon and being carried intermediate their ends by said cross member, said cross member extending between and perpendicularly to said rails, one of said rails being mounted on said member for sliding movement longitudinally thereof toward and away from said other rail to selected positions along said cross member to establish predetermined distances therebetween corresponding respectively to different widths of vehicles to be accommodated by said lift, pairs of spaced guides carried by said sliding rail, said guides in a pair being disposed on an opposite side of said cross member and each of said guides having a tongue engaging a respective one of said trackways to slidably guide said one rail during movement, and a jacking member manually operable to move said one rail longitudinally with respect to said cross member and said other rail.

2. The lift as in claim 1, wherein there is provided a jacking adjuster carried by said one rail and having a jacking lever mounted intermediate its ends for movement in a vertical arcuate path about a horizontal axis above said cross member, there being a row of holes spaced along said cross member, said jacking lever having one end terminating in a ball engageable in successive ones of said holes for moving said one rail along said cross member by manual movement of the lever in its arcuate path.

3. A vehicle lift comprising a vertically movable column, a horizontal H-frame assembly attached to the top of said column for movement therewith, said assembly comprising a horizontal cross member secured to said column and a pair of spaced rails carried by said cross member, said cross member having undercut longitudinal edges on opposite sides thereof which define trackways, the distance between said rails being selectively adjustable by movement of one of said rails relative to the other longitudinally of said cross member, said one rail having intermediate its ends an upwardly offset portion riding on said cross member, a plurality of guides carried by said one rail for movement therewith and disposed along the opposite longitudinal sides of said cross member, each of said guides having a tongue engaging a respective one of said trackways to hold said rails in substantially horizontal parallel relation to each other, and means for moving said one rail longitudinally of said cross member to the selected distance between said rails.

References Cited in the file of this patent

UNITED STATES PATENTS

| | | |
|---|---|---|
| 1,884,192 | Perry | Oct. 25, 1932 |
| 2,602,633 | Reedy | July 8, 1952 |

FOREIGN PATENTS

| | | |
|---|---|---|
| 534,578 | Great Britain | Mar. 11, 1941 |
| 678,668 | Germany | July 1, 1939 |